No. 768,623. PATENTED AUG. 30, 1904.
N. P. PETERSON.
EVENER.
APPLICATION FILED JAN. 25, 1904.
NO MODEL.
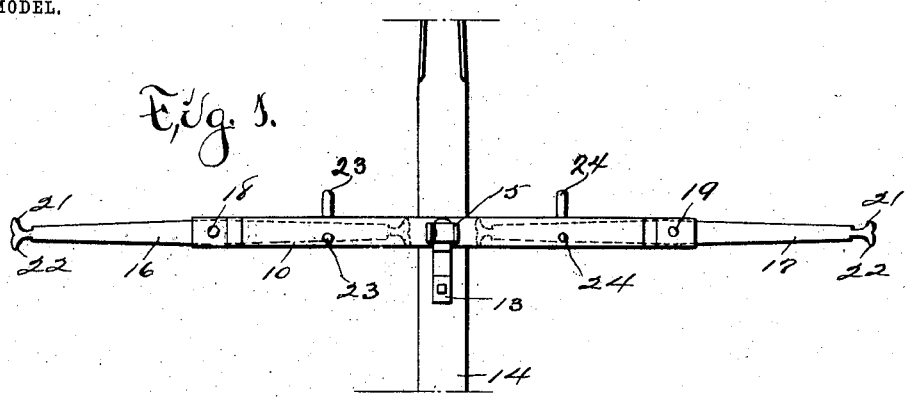
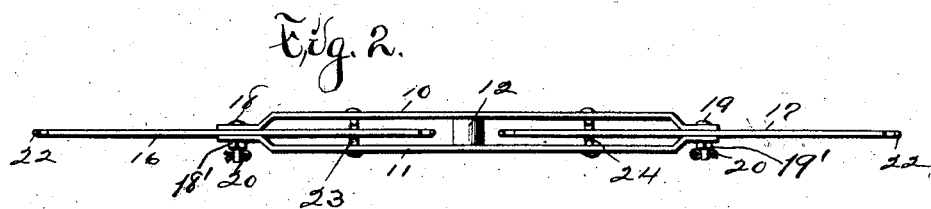
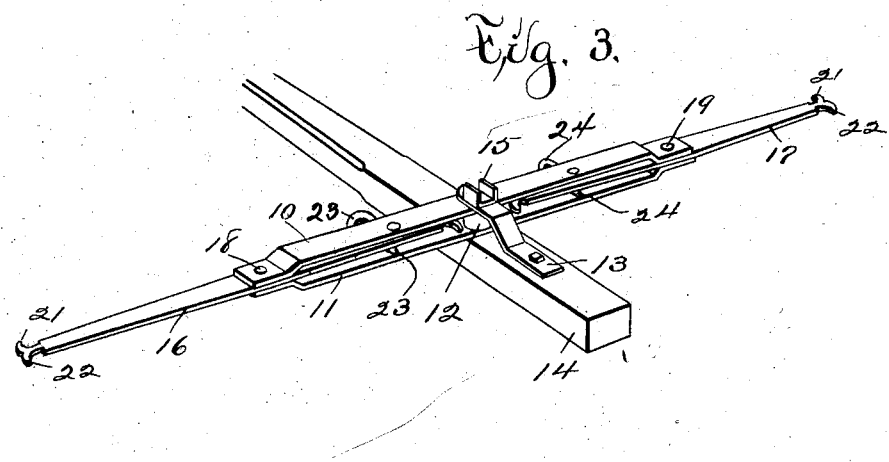

No. 768,623. Patented August 30, 1904.

UNITED STATES PATENT OFFICE.

NELS P. PETERSON, OF JEWELL, IOWA.

EVENER.

SPECIFICATION forming part of Letters Patent No. 768,623, dated August 30, 1904.

Application filed January 25, 1904. Serial No. 190,441. (No model.)

*To all whom it may concern:*

Be it known that I, NELS P. PETERSON, a citizen of the United States of America, and a resident of Jewell, Hamilton county, Iowa, have invented a new and useful Evener, of which the following is a specification.

The object of this invention is to provide improved means for hitching two draft-animals abreast to a vehicle or implement to be drawn thereby.

My invention consists in the construction, arrangement, and combination of elements hereinafter set forth, pointed out in my claims, and illustrated by the accompanying drawings, in which—

Figure 1 is a plan of the complete device. Fig. 2 is a rear elevation of the device. Fig. 3 is a perspective of the device mounted as required for practical use.

In the construction of the device, as shown, the numerals 10 11 designate evener-bars alike in construction and arranged parallel with each other. The end portions of the evener-bars 10 11 are offset into planes parallel with the body portions thereof and in close proximity with each other and are apertured transversely in registration. Apertures are formed in the central portions of the evener-bars 10 11, and a spacing-block 12, also centrally apertured, is mounted between said bars. A hammer-strap 13 is mounted on a tongue 14 and is apertured in its forward end portion in alinement with an aperture in the tongue. A wrench-pin 15 is mounted through the apertures in the hammer-strap 13, spacing-block 12, evener-bars 10 11, and tongue 14 and pivotally connects the evener-bars to the tongue. Swingletrees 16 17, preferably formed of bar metal, are mounted between the adjacent end portions of the evener-bars 10 11 and are pivoted thereto by means of pins 18 19, said pins held removably and replaceably by nuts 18' 19' and keys 20. The swingletrees 16 17 preferably are of greater width in their central portions and taper toward their opposite ends and terminate in diverging hooks 21 22, integral with the bodies thereof. By means of the diverging hooks 21 22 cockeyes, toggles, or traces may be attached to the swingletrees.

It will be observed that the swingletrees 16 17 are located between and in planes parallel with the evener-bars 10 11 and that said evener-bars are spaced apart by the spacing-block 12 a distance sufficient to permit the trace ends, toggles, or cockeyes to play to and fro between them on the inner ends of the swingletrees.

Shackles or yokes 23 24 are mounted on the evener-bars 10 11 and embrace the inner end portions of the swingletrees 16 17. The shackles limit movement of oscillation of the swingletrees in one direction to a predetermined degree, thus preventing the outer end portions of the swingletrees contacting with the wheels of a vehicle or implement drawn thereby.

I claim as my invention—

1. In a device of the class described, a swingletree formed of a single bar of metal and provided with integral hooks on its ends, which hooks are formed with reduced stem portions and diverging arms 21, 22 on the extremities of said stem portions, said arms being in the same plane as the body portion of the swingletree and extending laterally equal distances from the stem portions.

2. An evener, comprising bars arranged parallel with each other and spaced apart, a spacing-block between said bars, a bolt extending through the centers of said bars and spacing-block whereby the evener may be pivoted to a tongue, end portions of both bars offset toward each other, swingletrees formed of single flat metal bars and mounted between and pivoted at their centers to the offset end portions of said bars, hooks integrally formed in pairs on and diverging in said pairs from end portions of said swingletrees, and loops having their ends mounted through the bars and riveted and their body portions extending across the space between said bars in front of the inner end portions of the swingletrees.

Signed by me at Jewell, Iowa, this 5th day of October, 1903.

NELS P. PETERSON.

Witnesses:
N. P. CLEMMENSEN,
M. H. BROCK.